Aug. 28, 1928.
L. A. PARADISE ET AL
1,682,142
CORN HUSKING ROLLS
Filed June 8, 1927
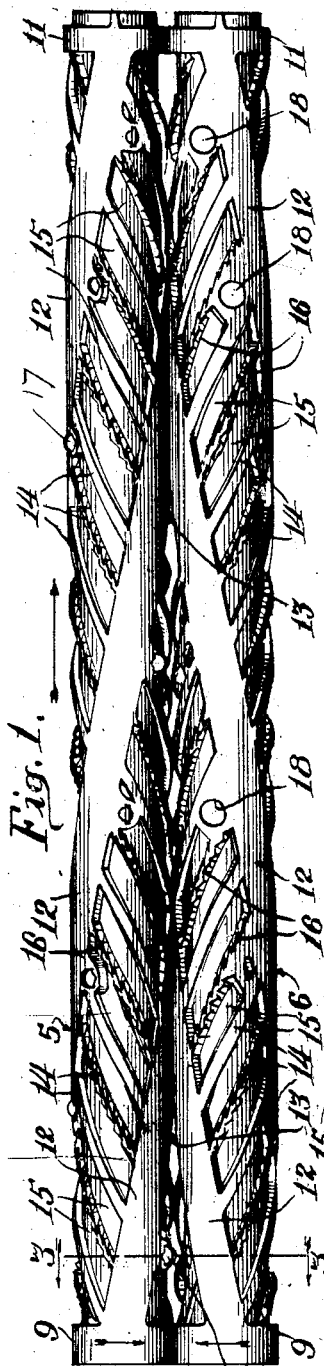
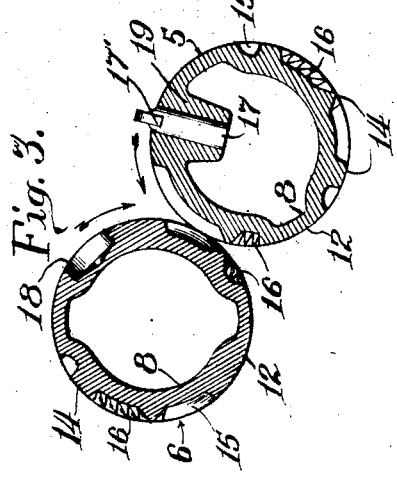
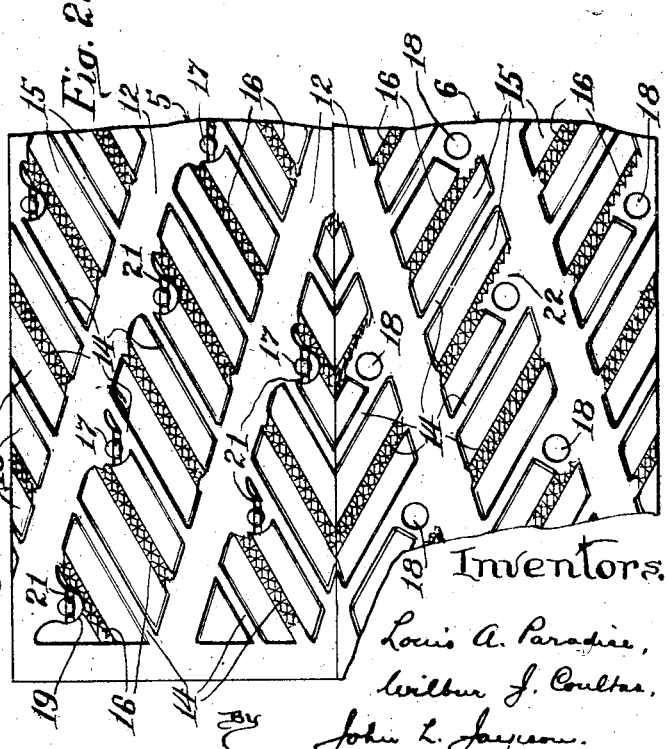

Patented Aug. 28, 1928.

1,682,142

UNITED STATES PATENT OFFICE.

LOUIS A. PARADISE AND WILBUR J. COULTAS, OF MOLINE, ILLINOIS, ASSIGNORS TO DEERE & COMPANY, OF MOLINE, ILLINOIS, A CORPORATION OF ILLINOIS.

CORN-HUSKING ROLLS.

Application filed June 8, 1927. Serial No. 197,309.

The present invention relates to corn husking rolls for corn pickers and like machines where a corn husking operation is performed.

The general object of the invention is to provide cooperating husking rolls characterized by an improved arrangement of ribs which are spiraled about the rolls at different angles so as to control the feed of the ears along the rolls and to secure a more efficient husking action of the rolls.

More specifically, it is one of the objects of the invention to provide each pair of cooperating rolls with a first series of ribs which are spiraled in one direction, and with a second series of ribs which are spiraled in the opposite direction, whereby the first series of ribs tend to retard the travel of the ears along the rolls as the husks are being removed therefrom, and both series of ribs cooperate in securing a more efficient husking action of the rolls. The husking pegs which are mounted on one roll of each pair are preferably spiraled similarly to the first series of ribs so as to cooperate with such ribs in tending to retard the flow of ears along the rolls.

Referring to the accompanying drawing wherein we have illustrated a preferred embodiment of our invention:

Figure 1 is a plan view of a pair of such rolls.

Fig. 2 is a fragmentary view showing the two rolls developed out in relief and

Fig. 3 is a transverse sectional view through the rolls, taken on the plane of the line 3—3 of Figure 1.

In corn pickers and in other like machines where these husking rolls are employed, they are usually placed side by side in a bank, and arranged in cooperating pairs, one of which pairs is indicated at 5—6. The rolls are revolved downwardly in opposite directions toward their contacting sides, as indicated by the arrows, so as to grip the husks, silks, etc. between the rolls for stripping the same from the ears and feeding such downwardly between the rolls to a point of discharge below. It is customary to incline the rolls downwardly to obtain a gravitational flow of ears along the same, the left hand ends of the rolls shown in Figure 1 corresponding to the elevated ends thereof for causing a flow of ears in a direction indicated by the arrow X in Figure 1. It is also customary to set one roll somewhat lower than its companion roll, as illustrated in Figure 3.

Referring now to the specific construction of the present rolls, it will be noted that each of such rolls comprises a main cylindrical portion 8 which is preferably tubular, as shown in Figure 3, and which may be arranged to receive shaft extensions at the ends thereof for journaling the rolls in cooperating bearings, said shaft extensions being generally geared together at one end of the rolls, as is well understood in the art. The upper ends of the rolls are formed with cylindrical collar portions 9, and the lower ends with like collar portions 11, these collar portions projecting from the cylindrical body portions 8 and contacting with each other to form rolling bearing surfaces for the ends of the rolls. Formed spirally in each roll is a first series of ribs 12 which have a long helical or spiral twist extending from end to end of each roll. These ribs are preferably quite wide, and project from the main body portion 8 to the same radial dimension as the collars 9—11, so that the outer surfaces of such ribs 12 lie flush with the outer surfaces of the collars, merging directly with the collars at both ends of the rolls. There are preferably two of these long ribs on each roll, spaced diametrically opposite from each other, and the spiral pitch thereof is preferably such that each rib makes one complete convolution in the length of the roll, although, of course, this can be varied as desired. Attention is directed to the fact that these ribs are spiraled in a direction tending to retard the flow of ears along the rolls i. e. the twist of each rib is such that it leads forwardly in the rotation of the rolls, up towards the raised ends thereof. The ribs are so formed that they match in the rotation of the rolls, defining V-shaped throats 13 between their converging leading edges, which V-shaped throats move upwardly towards the raised ends of the rolls in the rotation of the latter.

Extending transversely between the pairs of ribs 12—12 is a second series of relatively short cross ribs 14—14. The latter ribs also project outwardly from the cylindrical body portion 8 of each roll to the same radial dimension as the long ribs 12, whereby the upper surfaces of these cross ribs lie substantially flush with the upper surfaces of the long ribs. Such cross ribs are spiraled in the opposite direction from the long ribs 12, thus tending to feed or advance the ears along the rolls in opposition to the retarding action of the long ribs. Defined between the cross ribs 14 are spiral depressed channels 15. Alternate cross ribs have both edges toothed, as indicated at 16, these teeth being produced by forming notches or serrations which extend diagonally from the channel surfaces 15 across the edges of the ribs to approximately the centers thereof. Such toothed edges assist in stripping the husks from the ears.

The husking pegs or pins 17 are carried by the roll 5 and are received in pockets 18 formed in the roll 6. The pegs are preferably arranged in spiral rows, grouped with and having the same direction of lead as the long ribs 12, there being one of these rows of pegs along the leading edge of each long rib. For receiving such pegs, boss portions 19 project laterally from each rib 12, such boss portions being apertured and being of considerable radial depth, as illustrated in Figure 3, to afford firm anchorage for the pegs. The rounded head portions of the pegs have laterally projecting shoulders 17' which seat in slots 21 formed in the faces of the boss portions 19 (Fig. 2) and extending longitudinally of the roll 5, whereby the husking pegs are held against rotation in their mountings in the roll. The pockets 18 are recessed in laterally extending solid portions 22 formed between adjacent cross ribs along the leading edges of the long ribs on the roll 6.

In the operation of the rolls, it will be evident that the leading edges of the long spiral ribs 12 will exert a camming action on the ears and on the husks thereof, tending to retard the flow of ears along the rolls in the direction indicated. Also, the V-shaped throats or points of convergence 13 between these ribs will, in their progressive movement upwardly along the rolls, exert a slight wedging action tending to retard the flow of ears. Furthermore, the husking pegs 17, by virtue of having the same direction of lead as the ribs 12, will also tend to retard the flow of the ears. The foregoing characteristic of retarding the flow of ears has the advantage of enabling the rolls to be inclined downwardly at a sharper angle. It is desirable that the rolls be inclined at a relatively sharp down pitch to insure feeding of the ears without having them bob up and down on the surface of the rolls. The above described action of retarding the flow of ears permits of this relatively sharp down pitch, and still prevents an objectionably fast feed of the ears along the rolls. The cross ribs 14 tend to feed or advance the ears downwardly along the rolls, and such ribs, acting in opposition to the twist of the long ribs and of the husking pegs, insure an efficient stripping and cleaning of the husks from the ears. It will be observed that by virtue of the fact that the peripheral surfaces of the two series of coacting ribs have rolling contact with each other along the line of engagement of the rolls, such ribs have an efficient gripping action on the husks, silks, etc. This contacting of the opposing ribs is accommodated by providing spring mountings for the bearings at the ends of the rolls, whereby the rolls are permitted to have a slight separating movement. It will be obvious that by making both series of ribs flush with the peripheral surfaces of the rolls the casting and machining of the rolls is materially simplified.

What we claim as our invention and desire to secure by Letters Patent, is—

1. A pair of cooperating corn husking rolls, both of which are provided with relatively long ribs coacting between the rolls and spiraled about the surfaces of the rolls in directions tending to retard the travel of the ears along said rolls.

2. A pair of cooperating corn husking rolls, each of which rolls is provided with a rib extending substantially from end to end of the roll and spiraled with reference to the direction of rotation of the roll whereby to retard the travel of the ears along said rolls.

3. A pair of cooperating corn husking rolls, one of which is provided with a plurality of husking pegs spiraled about the surface of the roll in a direction tending to retard the travel of the ears along said rolls.

4. A pair of cooperating corn husking rolls, one of which is provided with a rib spiraled about the surface of the roll in a direction tending to retard the travel of the ears along said rolls, and a plurality of husking pegs carried by one of said rolls and spiraled to assist said ribs in tending to retard the travel of the ears along said rolls.

5. A pair of cooperating corn husking rolls arranged to rotate in opposite directions and each characterized by relatively long ribs spiraled in a direction tending to retard the travel of the ears along said rolls, and by a plurality of relatively short ribs spiraled in the opposite direction about said rolls, the long ribs on opposite rolls being arranged to match along the husking line between the rolls.

6. A pair of cooperating corn husking rolls arranged for rotation in opposite directions, each of said rolls comprising relatively long ribs extending substantially from end to end of the roll and spiraled in a direction tending to retard the travel of the ears along said rolls, and a plurality of relatively short ribs extending between said long ribs and spiraled in the opposite direction.

7. A pair of cooperating corn husking rolls arranged for rotation in opposite directions, each of said rolls comprising a plurality of ribs extending with a long spiral about said roll in a direction tending to retard the travel of the ears along said rolls, a plurality of short ribs on each of said rolls extending between said long ribs and spiraled in the opposite direction, and a plurality of husking pegs carried by one of said rolls and spiraled correspondingly to the long ribs of said roll, said husking pegs being receivable in pockets in the other of said rolls, said long ribs and said pegs having a progressive husking action on the ears in a direction counter to the travel of the ears along the rolls.

8. A pair of cooperating corn husking rolls arranged for rotation in opposite directions, each of said rolls comprising a plurality of rib members extending substantially from end to end of the roll and spiraled with reference to the direction of rotation of the roll whereby to retard the travel of the ears along said rolls, secondary rib members on each of said rolls spiraled in the opposite direction to said first rib members, said secondary rib members having toothed edges, and husking pegs carried by one of said rolls and spiraled correspondingly to the first mentioned rib members on said roll and being adapted to be received in pockets formed in the other of said rolls.

9. A pair of cooperating corn husking rolls adapted for rotation in opposite directions, each of said rolls comprising a rib member spiraled at one angle and a plurality of rib members spiraled at another angle about the roll, said first and second named rib members of both rolls contacting with each other in the rotation of the rolls.

10. A pair of cooperating corn husking rolls adapted to be rotated in opposite directions, each of said rolls comprising a relatively long rib extending substantially from end to end of the roll and spiraled about the surface of the roll in a direction tending to retard the travel of the ears along said rolls, and also comprising a plurality of relatively short ribs spiraled oppositely to said long rib, the peripheral faces of said ribs having the same radial dimension from the center of the roll, the companion ribs of both rolls having rolling contact with each other in the rotation of the rolls.

LOUIS A. PARADISE.
WILBUR J. COULTAS.